United States Patent [19]

Fujita

[11] Patent Number: 4,482,228

[45] Date of Patent: Nov. 13, 1984

[54] LENS CHANGEOVER MECHANISM FOR USE IN PHOTOGRAPHIC CAMERA

[75] Inventor: Susumu Fujita, Kobe, Japan

[73] Assignee: Fuji Photo Film Co., Ltd., Kanagawa, Japan

[21] Appl. No.: 521,807

[22] Filed: Aug. 10, 1983

[30] Foreign Application Priority Data

Aug. 10, 1982 [JP] Japan ................................. 57-139533
Jan. 11, 1983 [JP] Japan ..................... 58-3044

[51] Int. Cl.³ .............................................. G03B 3/00
[52] U.S. Cl. ................................ 354/195.12; 350/422
[58] Field of Search ........... 354/195.1, 195.11, 195.12; 350/422

[56] References Cited

U.S. PATENT DOCUMENTS

| | | | |
|---|---|---|---|
| 3,887,930 | 6/1975 | Bresson | 354/195.12 |
| 3,890,626 | 6/1975 | Ettischer | 354/195.12 |
| 4,099,191 | 7/1978 | Danan | 354/195.12 |
| 4,110,005 | 8/1978 | Bohm et al. | 350/422 |
| 4,119,983 | 10/1978 | Tanaka | 354/195.12 |
| 4,204,760 | 5/1980 | Kobayashi | 354/195.12 |
| 4,277,158 | 7/1981 | Zawodny | 354/195.12 |

Primary Examiner—A. A. Mathews
Attorney, Agent, or Firm—Sughrue, Mion, Zinn, Macpeak, and Seas

[57] ABSTRACT

A lens changeover mechanism for use in a photographic camera, including a master lens and a conversion lens. The mechanism further includes a changeover ring, a lens barrel which is axially movably fitted into the changeover ring, a focusing member, a focus guide which is slidably supported, for focusing adjustment, by the lens barrel, a changeover member which is pivotally supported by a camera body, and an auxiliary focus guide which is supported by the changeover member.

6 Claims, 8 Drawing Figures

4,482,228

LENS CHANGEOVER MECHANISM FOR USE IN PHOTOGRAPHIC CAMERA

BACKGROUND OF THE INVENTION

1. Field of the Invention

The present invention generally relates to photographic cameras and more particularly, to a lens changeover mechanism for use in a photographic camera, including a master lens and a conversion lens such that said photographic camera is selectively provided with a master lens system constituted by only the master lens and a conversion lens system constituted by both the master lens and the conversion lens, which lens changeover mechanism is adapted to change over either one of the master lens system and the conversion lens system to the other one of the master lens system and the conversion lens system.

2. Description of the Prior Art

Conventionally, there have been proposed several photographic cameras of a type having a built-in wide angle lens (master lens) and a built-in telephoto conversion lens, by which a wide angle photographic picture and a telephoto photographic picture can be selectively taken through manipulation of a lens changeover mechanism. In the known photographic cameras referred to above, it has been so arranged that, in order to change over a wide angle lens system constituted by only the wide angle lens to a telephoto lens system constituted by both the wide angle lens and the telephoto conversion lens, the telephoto conversion lens is brought into alignment with an optical axis of the wide angle lens after the wide angle lens has been advanced through a predetermined distance.

However, the prior art photographic cameras have such inconveniences that the lens changeover mechanism becomes complicated in structure due to displacement of the wide angle lens for focusing adjustment between a retracted position of the wide angle lens at the time of taking the wide angle photographic picture and a projected position of the wide angle lens at the time of taking the telephoto photographic picture, and a large torque is required for manipulating the lens changeover mechanism, while it is difficult to operatively associate the lens changeover mechanism with an autofocus mechanism.

SUMMARY OF THE INVENTION

Accordingly, an essential object of the present invention is to provide an improved lens changeover mechanism for use in a photographic camera, including a master lens and a conversion lens, in which changeover between one focal length of the photographic camera at the time when the conversion lens is brought out of alignment with an optical axis of the master lens and another focal length of the photographic camera at the time when the conversion lens is brought into alignment with the optical axis of the master lens can be performed rapidly and accurately merely by rotating a changeover ring employed in the lens changeover mechanism, with substantial elimination of the disadvantages inherent in conventional lens changeover mechanisms of this kind.

Another important object of the present invention is to provide an improved lens changeover mechanism of the above described type which can be operatively associated with an autofocus mechanism easily and makes the photographic camera compact in size.

Still another object of the present invention is to provide an improved lens changeover mechanism of the above described type which is simple in structure, highly reliable in actual use, suitable for mass production at low cost, and can be readily incorporated into photographic cameras and the like at low cost.

In accomplishing these and other objects according to one preferred embodiment of the present invention, there is provided an improved lens changeover mechanism for use in a photographic camera, including a master lens and a conversion lens such that said photographic camera is selectively provided with a master lens system constituted by only said master lens and a conversion lens system constituted by both said master lens and said conversion lens, said lens changeover mechanism being adapted to change over either one of the master lens system and the conversion lens system to the other one of the master lens system and the conversion lens system and comprising: a changeover ring; a lens barrel which is axially movably fitted into said changeover ring so as to be moved to projected and retracted positions thereof in response to changeover rotation of said changeover ring in first and second directions opposite to each other, respectively; a focusing member which is provided in a camera body of said photographic camera; a focus guide which is slidably supported, for focusing adjustment, by said lens barrel so as to be engaged with said focusing member; said master lens being supported at a front portion of said lens barrel by said focus guide; said conversion lens being pivotally supported at a rear portion of said lens barrel by said lens barrel so as to be brought into and out of alignment with an optical axis of said master lens in response to the changeover rotation of said changeover ring in said first and second directions, respectively; a changeover member which is pivotally supported by said camera body; and an auxiliary focus guide which is supported by said changeover member so as to be inserted between and retracted away from said focus guide and said focusing member in response to the changeover rotation of said changeover ring in said first and second directions, respectively.

In accordance with the present invention, changeover between one focal length of the photographic camera at the time when the conversions lens is brought into alignment with the optical axis of the master lens and another focal length of the photographic camera at the time when the conversion lens is brought out of alignment with the optical axis of the master lens can be performed rapidly and accurately merely through the changeover rotation of the changeover ring.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
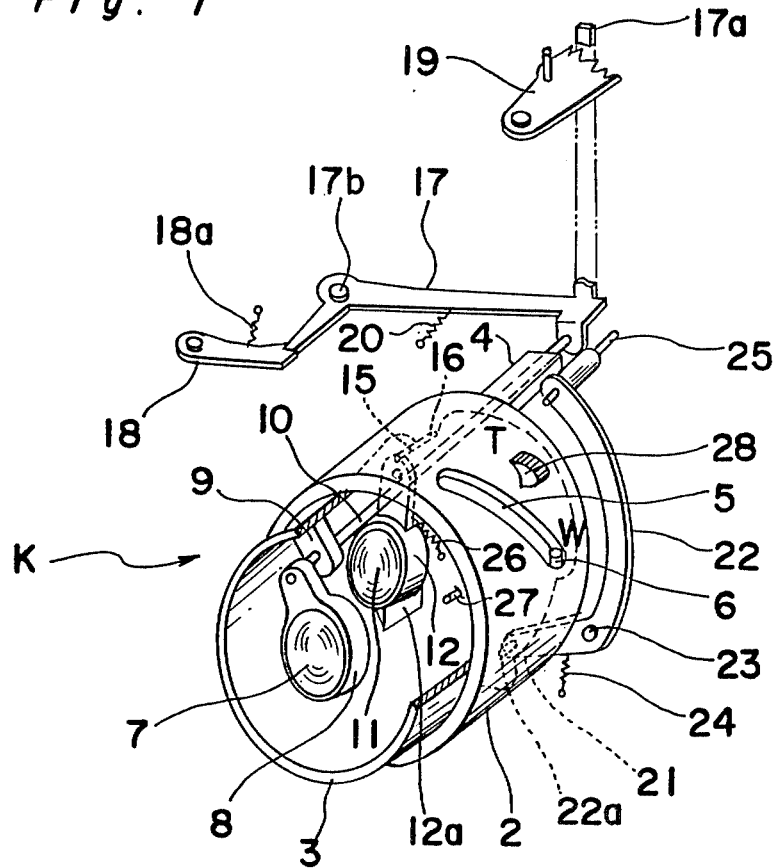
FIG. 1 is a partially cutaway perspective view of a lens changeover mechanism for use in a photographic camera, including a master lens and a conversion lens, according to one preferred embodiment of the present invention, with the conversion lens being held out of alignment with an optical axis of the master lens.

Referring now to the drawings, there is shown in FIGS. 1 to 6, a lens changeover mechanism K for use in a photographic camera including a camera body 1, according to one preferred embodiment of the present invention. The lens changeover mechanism K includes a cylindrical changeover ring 2 rotatably mounted to a front portion of the camera body 1, FIG. 6, and a cylindrical lens barrel 3 axially movably fitted into a front portion of the changeover ring 2. The lens changeover mechanism K further includes a master lens (wide angle lens) 7 supported at a front portion of the lens barrel 3 by a lens holder 8, and a conversion lens (telephoto conversion lens) 11 supported at a rear portion of the lens barrel 3 by a lens holder 12. The lens holder 8 is secured to a front end of a main focus guide 10 which is, in turn, slidably supported for focusing adjustment by a bracket 9 provided on the front inner periphery of the lens barrel 3 such that the main focus guide 10 is moved in an axial direction of the lens barrel 3. It is so arranged that rotation of the lens holder 8 is prevented by a rotational stopper member (not shown) such that the master lens 7 is held in alignment with a radially central portion of the lens barrel 3, i.e., an optical path of the photographic camera.

Meanwhile, the lens holder 12 is pivotally supported through a pin 14 by a bracket 13 provided on the rear inner periphery of the lens barrel 3 such that the conversion lens 11 is brought into and out of alignment with the optical path. It is to be noted that the lens holder 12, having a protrusion 12a formed at an outer peripheral portion thereof, is urged to rotate about the pin 14 in the counterclockwise direction in FIG. 2 by a spring 26 and the conversion lens 11 is brought into alignment with the optical path through contact of the protrusion 12a with a stop pin 27.

Figure 2:
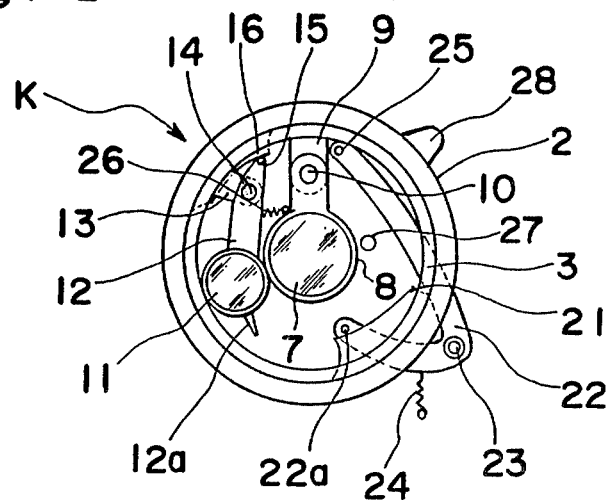
FIG. 2 is a front elevational view of the lens changeover mechanism of FIG. 1.

Furthermore, the lens barrel 3 has a rectangular projection 4 provided at a rear end thereof such that rotation of the lens barrel 3 is prevented through engagement of the projection 4 with a slot (not shown) of the camera body 1. As best shown in FIGS. 1 and 2, the changeover ring 2 has three cams, namely, a first cam 5 (groove cam) or slot formed substantially at an axially central portion of an outer perhiphery thereof, a second cam 21 formed at a rear inner peripheral portion thereof and a third cam 16 formed at another, rear inner peripheral portion thereof such that the second cam 21 and the third cam 16 confront each other substantially. The changeover ring 2 further has a lug 28 formed at an outer peripheral portion thereof. The first cam 5 having a shape of an elongated through-hole or slot extends obliquely and downwardly in a direction toward the camera body 1 from a telephoto position T, FIG. 4, to a wide angle position W, FIG. 5, so as to receive a cam pin 6 secured to an outer periphery of the lens barrel 3. It is so arranged that, when the changeover ring 2 is manually rotated by gripping the lug 28 until rotation of the changeover ring 2 is prevented through selective contact of the first cam 5, at the wide angle position W (FIGS. 1 to 3) and the telephoto position T (FIGS. 4 to 6), with the cam pin 6, the lens barrel 3 is selectively axially retracted into and projected out of the changeover ring 2.

Figure 3:
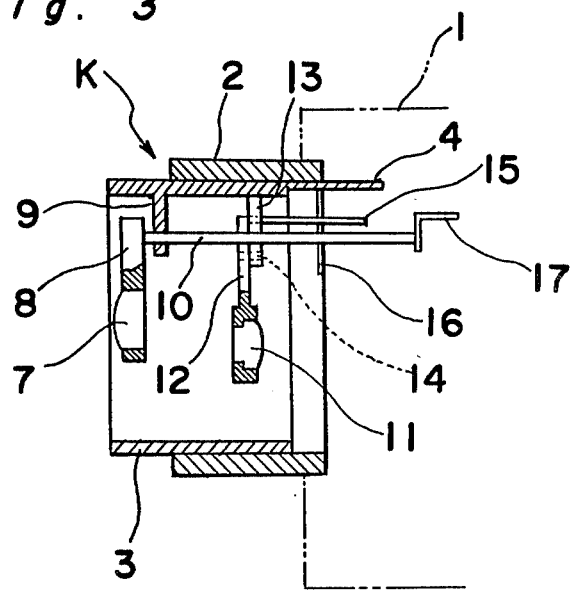
FIG. 3 is a longitudinal partially sectional view of the lens changeover mechanism of FIG. 1.
Figure 4:
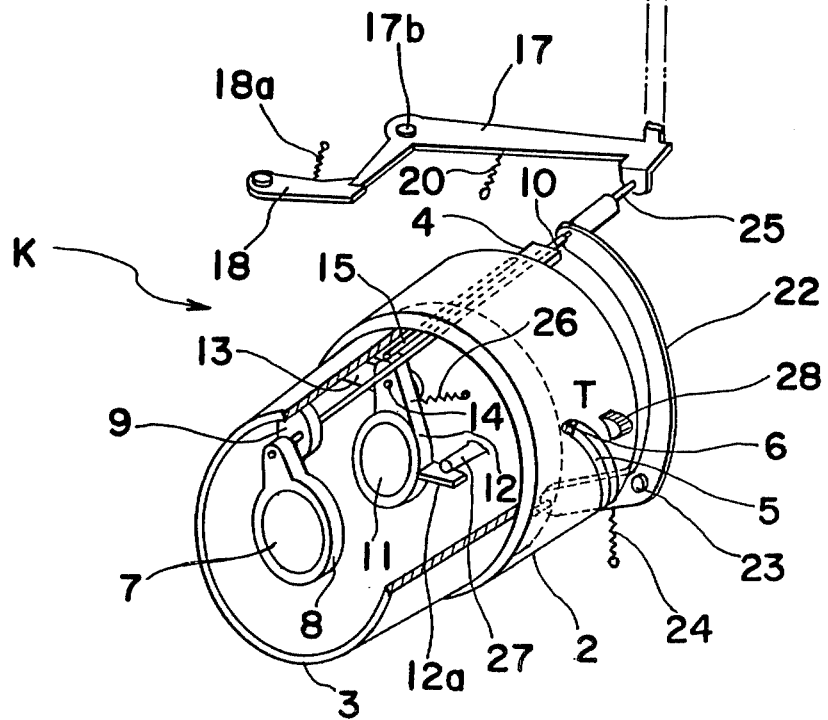
FIGS. 4, 5 and 6 are views similar to FIGS. 1, 2 and 3, respectively, showing the conversion lens held in alignment with the optical axis of the master lens.
Figure 5:
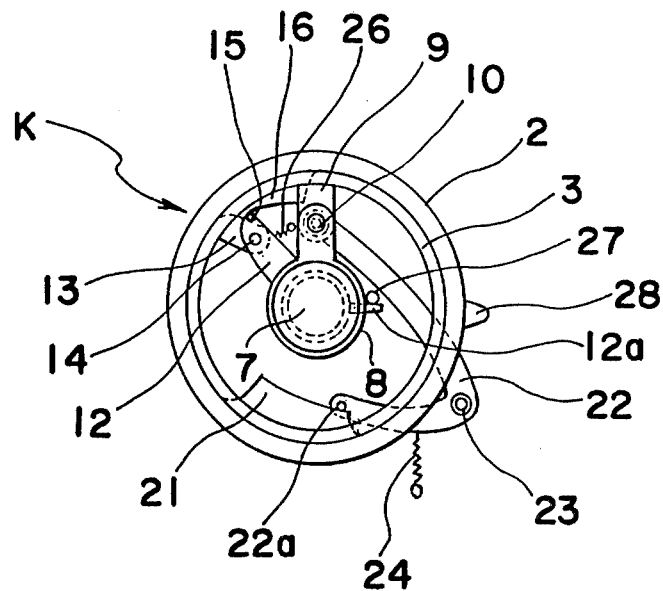
Figure 6:
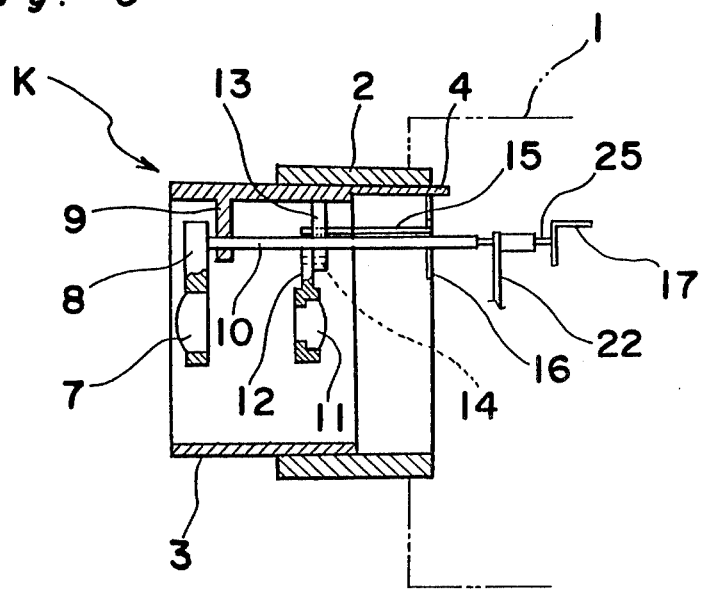

Meanwhile, a cam pin 15 attached to a distal end of the lens holder 12 remote from the conversion lens 11 engages with the third cam 16. It is so arranged that, in response to selective changeover rotation of the changover ring 2 to the wide angle position W and the telephoto position T as described above, the lens holder 12, i.e., the conversion lens 11, is pivotally brought out of and into alignment with an optical axis of the master lens 7, respectively, through engagement of the cam pin 15 with the third cam 16. More specifically, at the time of changeover rotation of the changeover ring 2 to the wide angle position W, the lens holder 12 is pivoted about the pin 14 in the clockwise direction in FIG. 2 through engagement of the cam pin 15 with the third cam 16 against an urging force of the spring 26 such that the conversion lens 11 is brought out of alignment with the optical axis of the master lens 7 as shown in FIGS. 1 to 3, whereby a master lens system composed of only the master lens 7 is constituted. On the other hand, at the time of changeover rotation of the changeover ring 2 to the telephoto position T, the lens holder 12 is pivoted about the pin 14 in the counterclockwise direction in FIG. 2 through engagement of the cam pin 15 with the cam 16 and by the urging force of the spring 26 such that the conversion lens 11 is brought into alignment with the optical axis of the master lens 7 rearwardly of the master lens 7 through contact of the protrusion 12a with the stop pin 27 as shown in FIGS. 4 to 6, whereby a telephoto lens system composed of both the master lens 7 and the conversion lens 11 is constituted.

Moreover, a lens driving lever 17 which is urged in a direction away from the camera body 1 by a spring 20 is pivotally provided in the camera body 1 so as to advance the lens holder 8 through contact of the lens driving lever 17 with the main focus guide 10 which is urged in the direction toward the camera body 1 by a spring (not shown). Further, the lens driving lever 17 has a raised portion 17a extending upwardly such that the raised portion 17a is engaged with a cam 19. A stop lever 18 which is urged in the direction toward the camera body 1 by a spring 18a is provided so as to be brought into and out of engagement with the lens driving lever 17 after and before shutter release of the photographic camera, respectively. More specifically, prior to the shutter release, the lens driving lever 17 is retained in position through its engagement with the stop lever 18. On the contrary, at the time of the shutter release, the cam 19 is rotated, by a lens presetting mechanism (not shown), to a predetermined position determined by an output from a distance measuring system and then, the lens driving lever 17 is pivoted about a pin 17b in the direction away from the camera body 1 by the spring 20 through disengagement of the lens driving lever 17 from the stop lever 18 so as to push the main focus guide 10 in the direction away from the camera body 1 until displacement of the raised portion 17a is prevented by the cam 19 through contact therebetween, whereby the master lens 7 is advanced axially through a predetermined distance.

Furthermore, a changeover member 22 having a substantially arcuate shape is pivotally supported by a pin 23 rearwardly of the changeover ring 2. The changeover member 22 having an auxiliary focus guide 25 slidably secured to one end thereof and a cam pin 22a fixedly secured to the other end thereof is urged to rotate about the pin 23 in the counterclockwise direction in FIG. 2 by a spring 24 so as to be brought into engagement with the second cam 21 of the changeover ring 2. At the time of the changeover rotation of the changeover ring 2 to the wide angle position W, the changeover member 22 is pivoted about the pin 23 in the clockwise direction in FIG. 2 through engagement of the cam pin 22a with the second cam 21 against the urging force of the spring 24 such that the auxiliary focus guide 25 is retracted away from the main focus guide 10 and the lens driving lever 17 as shown in FIGS. 1 to 3. On the other hand, at the time of the changeover rotation of the changeover ring 2 to the telephoto position T, the lens barrel 3 is projected out of the changeover ring 2 together with the lens holder 8 and the main focus guide 10 through engagement of the cam pin 6 with the first cam 5 as described above and, at the same time, the changeover member 22 is pivoted about the pin 23 in the counterclockwise direction in FIG. 2 through engagement of the cam pin 22a with the second cam 21 and by the urging force of the spring 24 such that the auxiliary focus guide 25 is inserted between the main focus guide 10 and the lens driving lever 17 as shown in FIGS. 4 to 6, so that the main focus guide 10 is pushed via the auxiliary focus guide 25 by the lens driving lever 17 in the direction away from the camera body 1, whereby the master lens 7 is advanced through a predetermined distance in the same manner as described above.

In the above described arrangement of the lens changeover mechanism K, when the changeover ring 2 is disposed at the wide angle position W, the lens barrel 3 is axially retracted into the changeover ring 2 through engagement of the cam pin 6 with the first cam 5 and the conversion lens 11 is pivotally brought out of alignment with the optical axis of the master lens 7 through engagement of the cam pin 15 with the third cam 16, while the auxiliary focus guide 25 is pivotally retracted away from the main focus guide 10 and the lens driving lever 17 through engagement of the cam pin 22a with the second cam 21 such that the main focus guide 10 is brought into direct contact with the lens driving lever 17 as shown in FIGS. 1 to 3, whereby the main focus guide 10 is pushed by the lens driving lever 17 so as to advance the master lens 7 through a predetermined distance corresponding to a pivotal angle of the lens driving lever 17 for focusing adjustment of the master lens system.

Subsequently, when the changeover ring 2 is changed over to the telephoto position T by gripping the lug 28, the lens barrel 3 is axially projected out of the changeover ring 2 together with the lens holder 8 and the main focus guide 10 through engagement of the cam pin 6 with the first cam 5 and the auxiliary focus guide 25 is pivotally inserted between the main focus guide 10 and the lens driving lever 17 through engagement of the cam pin 22a with the second cam 21, while the conversion lens 11 is pivotally brought into alignment with the optical axis of the master lens 7 through engagement of the cam pin 15 with the third cam 16 as shown in FIGS. 4 to 6 such that changeover from a focal length of the master lens system to a focal length of the telephoto lens system is effected, whereby the telephoto lens system composed of both the master lens 7 and the conversion lens 11 is constituted. Since the auxiliary focus guide 25 is brought into contact with the lens driving lever 17 at this time, the main focus guide 10 is pushed via the auxiliary focus guide 25 by the lens driving lever 17 so as to advance the master lens 7 through a predetermined distance corresponding to a pivotal angle of the lens driving lever 17 for focusing adjustment of the telephoto lens system.

Figure 7:
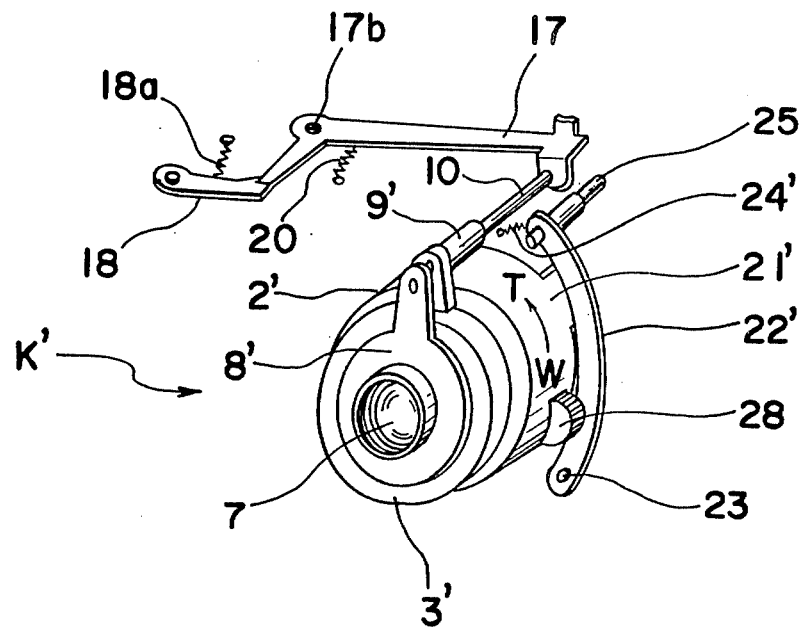
FIG. 7 and 8 are views similar to FIGS. 1 and 4, respectively, particularly showing a modification thereof.
Figure 8:
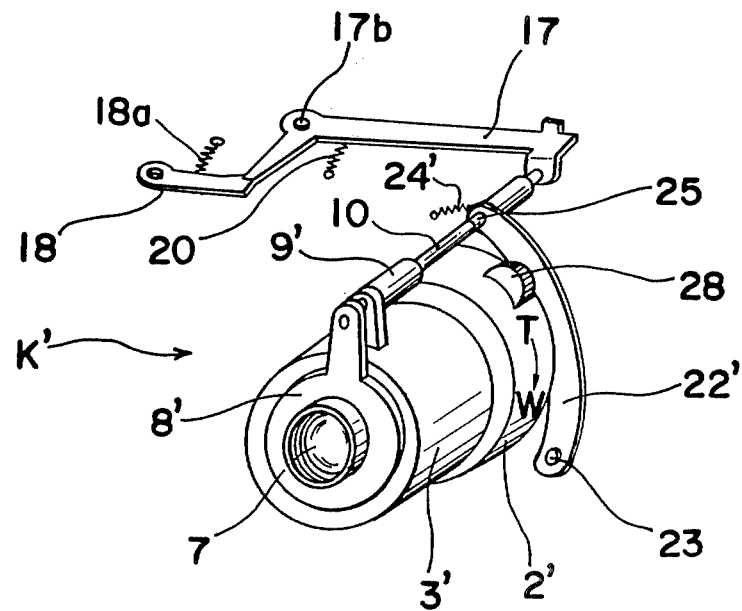

Referring now to FIGS. 7 and 8, there is shown a lens changeover mechanism K' which is a modification of the lens changeover mechanism K. It will be readily understood that the changeover ring 2, lens barrel 3, lens holder 8, bracket 9, second cam 21, changeover member 22 and spring 24 are, respectively, replaced by a changeover ring 2', a lens barrel 3', a lens holder 8', a bracket 9', a second cam 21', a changeover member 22' and a spring 24' in the modified lens changeover mechanism K'. The second cam 21' is formed at a rear end portion of the changeover ring 2' so as to be substantially flush with the outer periphery of the changeover ring 2'. Meanwhile, since the lens holder 8' is provided so as to project axially out of an outer periphery of the lens barrel 3', the bracket 9' is provided on the outer periphery of the lens barrel 3'. The changeover member 22' of an arcuate shape is pivotally supported by the pin 23 provided at one end thereof and is urged in the counterclockwise direction in FIG. 7 by the spring 24' attached to the other end thereof. In the above described arrangement of the modified lens changeover mechanism K', the auxiliary focus guide 25 is retracted from and inserted between the main focus guide 10 and the lens driving lever 17 in response to changeover rotation of the changeover ring 2' to the wide angle position W (FIG. 7) and the telephoto position T (FIG. 8), respectively in the same manner as described in the lens changeover mechanism K. Since other constructions of the modified lens changeover mechanism K' are similar to those of the lens changeover mechanism K, the detailed description thereof is abbreviated for the sake of brevity. In addition, although rotation of the lens barrel 3 is prevented through engagement of the projection 4 of the lens barrel 3 with the slot of the camera body 1 in the lens changeover mechanism K and the modified lens changeover mechanism K', it can be also so arranged that a pin (not shown) secured to the camera body 1 is engaged with an elongated through-hole (not shown) formed on the lens barrel 3, in place of the projection 4 and the slot of the camera body 1.

As is clear from the foregoing description, in accordance with the present invention, since it is so arranged that, in response to the changeover rotation of the changeover ring from the wide angle position to the telephoto position, the lens barrel is axially projected out of the changeover ring by the first cam and the auxiliary focus guide is pivotally inserted between the main focus guide and the focusing member (lever driving lever) by the second cam, while the conversion lens is pivotally brought into alignment with the optical axis of the master lens rearwardly of the master lens by the third cam, the changeover from the focal length of the master lens system to the focal length of the telephoto lens system can be performed merely through changeover rotation of the changeover ring.

Furthermore, in accordance with the present invention, since the lens barrel, the auxiliary focus guide and the conversion lens are, respectively, operatively associated with the first cam, the second cam and the third cam of the changeover ring, changeover between the master lens system and the telephoto lens system can be performed reliably and accurately.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A lens changeover mechanism for use in a photographic camera, said camera including a camera body and a master lens and a conversion lens such that said photographic camera is selectively provided with a master lens system constituted only by said master lens and a conversion lens system is constituted by both said master lens and said conversion lens, said lens changeover mechanism functioning to change over either one of the master lens system and the conversion lens system to the other one of the master lens system and the conversion lens system and said mechanism comprising:
   a changeover ring;
   a lens barrel axially movably fitted into said changeover ring so as to be movable to projected and retracted positions thereof in response to changeover rotation of said changeover ring in first and second directions opposite to each other, respectively;
   a focusing member provided in said camera body of said photographic camera;
   a focus guide, slidably supported, for focusing adjustment, by said lens barrel so as to be engaged with said focusing member;
   said master lens supported at a front portion of said lens barrel by said focus guide;
   said conversion lens pivotally supported at a rear portion of said lens barrel by said lens barrel so as to be brought into and out of alignment with an optical axis of said master lens in response to the changeover rotation of said changeover ring in said first and second directions, respectively;
   a changeover member pivotally supported by said camera body; and
   an auxiliary focus guide supported by said changeover member so as to be inserted between and retracted away from said focus guide and said focusing member in response to the changeover rotation of said changeover ring in said first and second directions, respectively.

2. A lens changeover mechanism as claimed in claim 1, wherein said changeover ring is formed with a first cam, a second cam and a third cam, and said mechanism comprises:
   means operatively coupling said first cam with said lens barrel so as to cause said lens barrel to be moved to said projected and retracted positions in response to the changeover rotation of said changeover ring in said first and second directions, respectively,
   means operatively coupling said second cam with said changeover member so as to cause said auxiliary focus guide to be inserted between and retracted away from said focus guide and said focusing member in response to the changeover rotation of said changeover ring in said first and second directions, respectively, and
   means operatively coupling said third cam with said conversion lens so as to cause said conversion lens to be brought into and out of alignment with the optical axis of said master lens in response to the changeover rotation of said changeover ring in said first and second directions, respectively.

3. A lens changeover mechanism as claimed in claim 2, wherein said master lens is a wide angle lens and said conversion lens is a telephoto conversion lens.

4. A lens changeover mechanism as claimed in claim 2, wherein said lens barrel is provided with a projection and said camera body is formed with a slot engageable with said projection such that rotation of said lens barrel is prevented through engagement of said projection with said slot.

5. A lens changeover mechanism as claimed in claim 2, further including a pin secured to said camera body, and
   said lens barrel being formed with an opening engageable with said pin such that rotation of said lens barrel is prevented through engagement of said pin with said opening.

6. A lens changeover mechanism as claimed in claim 2, further including a cam pin engageable with said first cam and secured to an outer peripheral portion of said lens barrel,
   said first cam being a cam groove formed on an outer peripheral portion of said changeover ring.

* * * * *